(12) United States Patent
Noisternig et al.

(10) Patent No.: US 7,706,142 B2
(45) Date of Patent: Apr. 27, 2010

(54) ELECTRONIC BUILT-IN SYSTEM

(75) Inventors: René Noisternig, Conweiler (DE);
Robby Rieger, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 179 days.

(21) Appl. No.: 11/314,951

(22) Filed: Dec. 20, 2005

(65) Prior Publication Data

US 2007/0236880 A1    Oct. 11, 2007

(30) Foreign Application Priority Data

Dec. 20, 2004   (EP)  .................................. 04030144

(51) Int. Cl.
*H05K 7/20*   (2006.01)
(52) U.S. Cl. ....................... 361/695; 361/687; 361/697; 174/16.1
(58) Field of Classification Search ......... 361/690–697, 361/715, 719; 165/80.3, 104.33, 122; 174/16.1, 174/16.3
See application file for complete search history.

(56) References Cited

U.S. PATENT DOCUMENTS

| | | | | |
|---|---|---|---|---|
| 5,731,953 | A * | 3/1998 | Sakurai ....................... | 361/695 |
| 6,119,060 | A * | 9/2000 | Takayama et al. ............. | 701/36 |
| 6,130,727 | A * | 10/2000 | Toyozumi .................... | 348/837 |
| 6,466,433 | B1 * | 10/2002 | Diaz et al. ................... | 361/683 |
| 6,498,614 | B1 | 12/2002 | Aman et al. | |
| 6,639,886 | B1 * | 10/2003 | Cook et al. .................. | 720/649 |
| 6,686,911 | B1 * | 2/2004 | Levin et al. .................. | 345/184 |
| 6,721,179 | B2 * | 4/2004 | Song et al. ................... | 361/690 |
| 6,735,080 | B1 * | 5/2004 | Chang ......................... | 361/695 |
| 6,826,046 | B1 | 11/2004 | Muncaster et al. | |
| 6,886,060 | B2 * | 4/2005 | Wang et al. ................... | 710/72 |
| 6,982,872 | B2 * | 1/2006 | Behl et al. ................... | 361/687 |
| 6,989,993 | B2 * | 1/2006 | Amari et al. ................. | 361/752 |
| 7,061,761 | B2 * | 6/2006 | Tucker et al. ................ | 361/695 |
| 7,068,506 | B2 * | 6/2006 | Behl ........................... | 361/695 |
| 7,158,380 | B2 * | 1/2007 | Green et al. ................. | 361/704 |

(Continued)

FOREIGN PATENT DOCUMENTS

CN        1494371 A       9/2003

(Continued)

*Primary Examiner*—Boris L Chervinsky
(74) *Attorney, Agent, or Firm*—The Eclipse Group LLP

(57) ABSTRACT

An electronic built-in system for installation in a support structure mounted in a passenger compartment of a vehicle. The system includes at least one electronic module and a housing for receiving the electronic modules. The housing is mounted to the support structure of the vehicle and includes a front control panel with operating elements for operating the electronic system. The front control panel faces the passenger compartment. A cooling unit is provided in the housing for guiding cooling air through the housing for cooling the electronic module. At least one first opening in an outer wall portion of the housing supplies cooling air to the housing. At least one second opening in an outer wall portion of the housing removes the cooling air from the housing. The first and second openings are arranged at different wall portions of the housing, which are separated from the passenger compartment by the support structure when the built in system is installed in the support structure.

25 Claims, 6 Drawing Sheets

U.S. PATENT DOCUMENTS

| | | | |
|---|---|---|---|
| 7,164,579 B2 * | 1/2007 | Muncaster et al. | 361/685 |
| 7,218,516 B2 * | 5/2007 | Yu et al. | 361/695 |
| 7,245,489 B2 * | 7/2007 | Natsume et al. | 361/695 |
| 7,315,447 B2 * | 1/2008 | Inoue et al. | 361/687 |
| 2004/0069462 A1 | 4/2004 | Hashimoto | |

FOREIGN PATENT DOCUMENTS

| | | |
|---|---|---|
| DE | 19821683 A1 | 12/1998 |
| EP | 0 456 171 A2 | 11/1991 |

* cited by examiner

ELECTRONIC BUILT-IN SYSTEM

CROSS-REFERENCE TO RELATED APPLICATION(S)

This application claims priority of European Patent Application Serial Number 04030144.2, filed on Dec. 20, 2004, titled ELECTRONIC BUILT-IN SYSTEM; which is incorporated by reference in this application in its entirety.

FIELD OF THE INVENTION

This invention relates generally to systems mounted in a passenger compartment of a vehicle and more particularly, to an electronic built-in system and navigation systems having an electronic built-in system for installation in a console or a dashboard of a vehicle.

DESCRIPTION OF RELATED ART

In recent years, the use of a multimedia system in a vehicle has become more and more common. These multimedia systems, which are normally controlled by one central head unit, generally have different electronic modules for the different multimedia systems. These electronic systems often include a navigation module for calculating a route from an originating location to a destination location in a geographic region. The electronic systems may also include an audio module, which allows the driver of the vehicle to hear music, or radio plays provided on a compact disc or a DVD, which is insertable into the multimedia system. Furthermore, a radio receiver may be provided to receive different radio programs. The use of telecommunication modules has become more common in these systems. For example, a cellular phone may be incorporated into the electronic system.

These electronic systems are normally built into a support structure of the passenger compartment of the vehicle, be it the centre console of the vehicle or the dash board. Normally, the space behind the centre console of the dash board is limited, as many different control units and features, such as the ventilation system of the vehicle are all located behind the centre console or the dash board.

These electronic systems normally further have a display, which informs the user of an operating status of the multimedia system. For example, the display can be used for guiding the user to the destination location by showing map data or by showing the driving direction.

It is preferred that all the different electronic modules be incorporated into one housing needing little space behind the support structure in which the electronic built-in system is incorporated. Due to the fact that the multiple electronic modules are arranged in a very compact space, the heat generated by the different modules may create problems that affect the operation of the electronic system. Simply put, the heat generated by the different electronic modules should be dissipated. Accordingly, there exists a need to provide an electronic built-in system, which can be cooled effectively. Furthermore, some electronic components generate more heat than others. Accordingly, a further need exists to provide an electronic built-in system in which the electronic modules are arranged in such a way that the electronic modules generating most of the heat can be cooled down in an effective way.

SUMMARY

An electronic built-in system for installation in a support structure mounted in a passenger compartment of the vehicle is described. The system includes a housing for receiving at least one electronic module. The housing is mounted to the support structure of the vehicle and includes a front control panel facing the passenger compartment with operating elements for operating the electronic system. The housing is accommodated in the support structure, and the front panel can be controlled by the driver from the passenger compartment. A cooling unit is provided in the housing to guide cooling air through the housing for cooling the electronic modules. The housing has an outer wall portion having at least one first opening for supplying cooling air to the housing. At least one second opening is provided in the outer wall portion of the housing for removing the cooling air from the housing. The first and second openings are arranged at different wall portions of the housing, the different wall portions being separated from the passenger compartment by the support structure.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
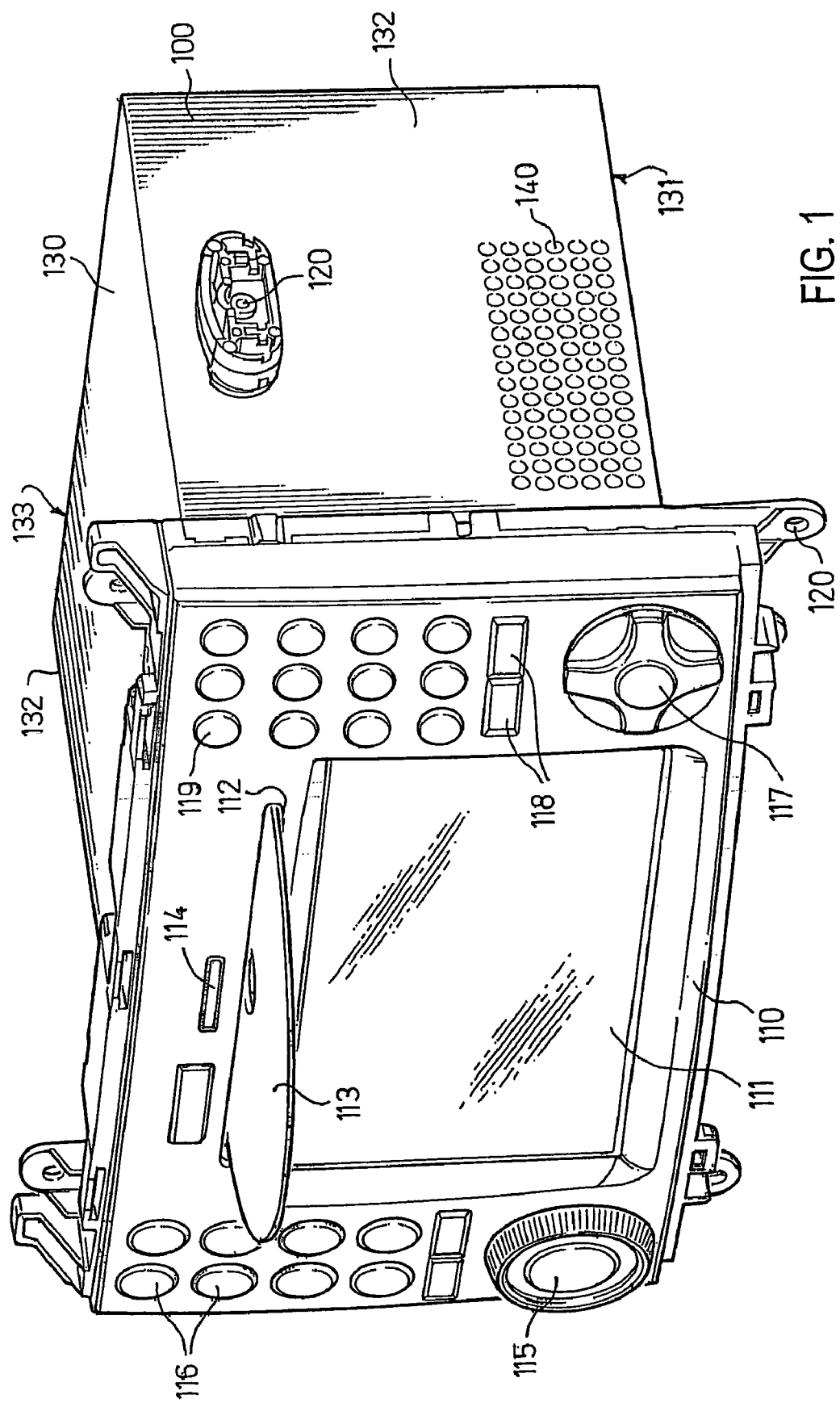
FIG. 1 is a perspective front view of an electronic built-in system for installation in a vehicle.

FIG. 1 is a perspective front view of an electronic built-in system for installation in a vehicle. The electronic system includes a housing 100 and may be installed in an accommodating structure or support structure (not shown) in a passenger compartment of the vehicle. The system includes a front control panel 110 situated so as to be accessible to the driver. The front control panel 110 includes different operating elements for controlling the electronic system.

In the example shown in FIG. 1, the front control panel 110 includes a display 111 for displaying information about the operating mode of the system. A large display 111 is especially useful when the electronic system is working in a navigation operating mode in which the driver of the vehicle is guided to a predetermined destination location. Map data showing the different streets or showing any other driving related information can be displayed on the display 111. When the system is working in a radio or audio operating mode, the display can show the name of the radio station and the received frequency or the track of an audio compact disk or a DVD.

A slot 112 above the display 111 in the front panel 110 provides for the insertion of a storing medium such as a compact disk or a DVD 113. A second slot 114 may be provided in which a memory card such as an SD card can be introduced. On the lower left side of the front control panel a turn press button 115 is provided which may be used to control the volume and which may be used to turn the system on or off. The control buttons 116 may be used to enable the different operating modes of the electronic system. Each button 116 may be used to enable a different operating mode, e.g., one button 116 may be used to switch to the radio mode, another button may be used to switch to the navigation mode, etc.

On the lower right side of the control panel, a rocker 117 may be provided for controlling the different operating modes. For example, the rocker 117 may be used for choosing an address in the navigation mode, etc. Above the rocker 117, two forward and backward buttons 118 can be provided, which may, for example, be used for scanning the frequency band in a radio operating mode or which may be used as skip buttons in an audio mode to move from one title to another. Several buttons 119 in the upper right hand corner may be used in a telecommunication operating mode. For example, these buttons 119 can be used for dialing a telephone number.

It should be understood that the operating elements could be arranged in a completely different way, and that also other operating elements could be used. The different ways of arranging operating elements on a front control panel is well-known in the art, so that a detailed description thereof can be omitted.

Furthermore, fixing elements 120 for fixing the electronic built-in system to a console (not shown) of the vehicle are provided. The electronic system is arranged in such a way that the front control panel 110 is accessible to the driver or to other passengers in the passenger compartment of the vehicle, the rest of the housing 100 being hidden behind the support structure supporting the housing 100.

The housing 100 includes an upper wall 130, a bottom wall 131, two sidewalls 132 and a back wall 133. As can be seen in FIG. 1, the sidewall 132 has several first openings 140 in its lower part. As explained below, these first openings 140 are provided for supplying cooling air for the electronic modules installed inside the housing 100. The first openings 140 act as air inlet of the system.

The housing 100 is preferably a 2-DIN housing fitting in a 2-DIN recess of the support structure. The DIN standard is a standard which is used in vehicles for describing the space needed to accommodate an electronic built-in system such as a radio or navigation system. When the electronic built-in system includes a navigation module, a larger display may be used than in 1-DIN systems. In this case, a 2-DIN system may be used so that additional space is provided for the display and for the control buttons for controlling the different electronic modules of the system.

Figure 2:
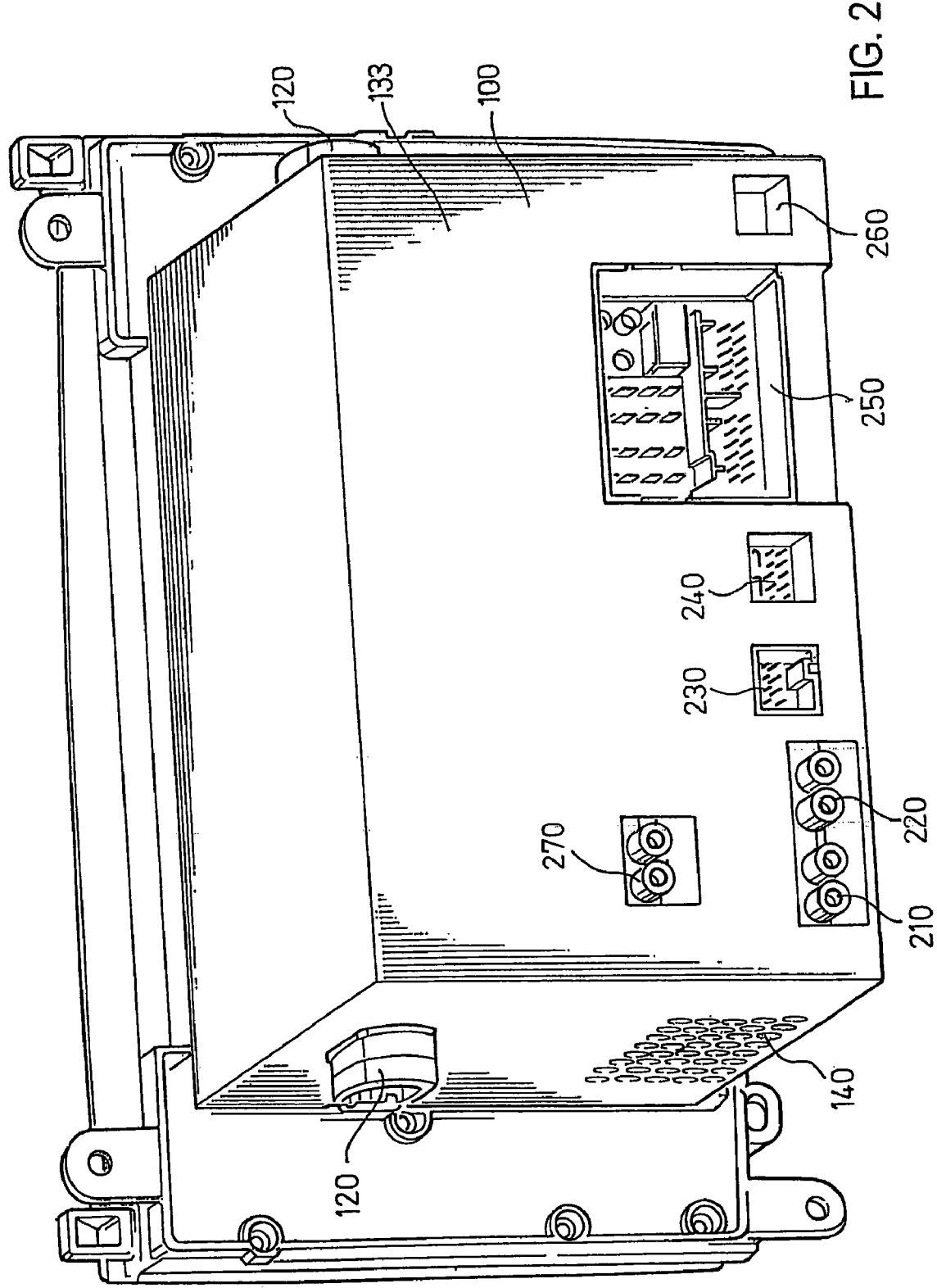
FIG. 2 is a perspective rear view of the system of FIG. 1.

FIG. 2 is a perspective rear view of the system of FIG. 1. As can be seen in FIG. 2, the back wall 133 includes several recesses, so that different connectors are accessible. The connectors broadly provide access to a wide-variety of signals. For example, the connectors may include typical connectors that allow for hardwired connections; or they may include transmitters and/or receivers that provide access to wireless connections. In the lower left part of the back wall 133 a connector pair 210 is provided, which may be used for receiving a GPS signal or a Bluetooth signal, for example, from a telecommunication unit such as a cellular phone. Next to the connectors 210, two connectors 220 are shown which may receive signals from a wireless LAN network, or may receive video signals from a rear camera provided for controlling the space behind the vehicle. A connector 230 may be provided to exchange data with a rear seat entertainment system allowing the passengers in the back to use another entertainment program. The connector 240 may be used to exchange data with a television tuner, if provided in the vehicle. The connecting system 250 may be used to exchange data with an optical bus system provided in the vehicle where all the relevant driving data are provided for processing. Additionally, an USB interface 260 may be provided. Furthermore, a connector unit 270 may be provided for transmitting a radio signal received by an antenna of the vehicle. As can be seen from FIG. 2, all the connectors are arranged in the lower part of the housing 100. As will be explained later on, this is because, in the example shown in FIG. 2, all the electronic modules or electronic circuit boards having the connectors are arranged in the lower part of the housing.

Figure 3:
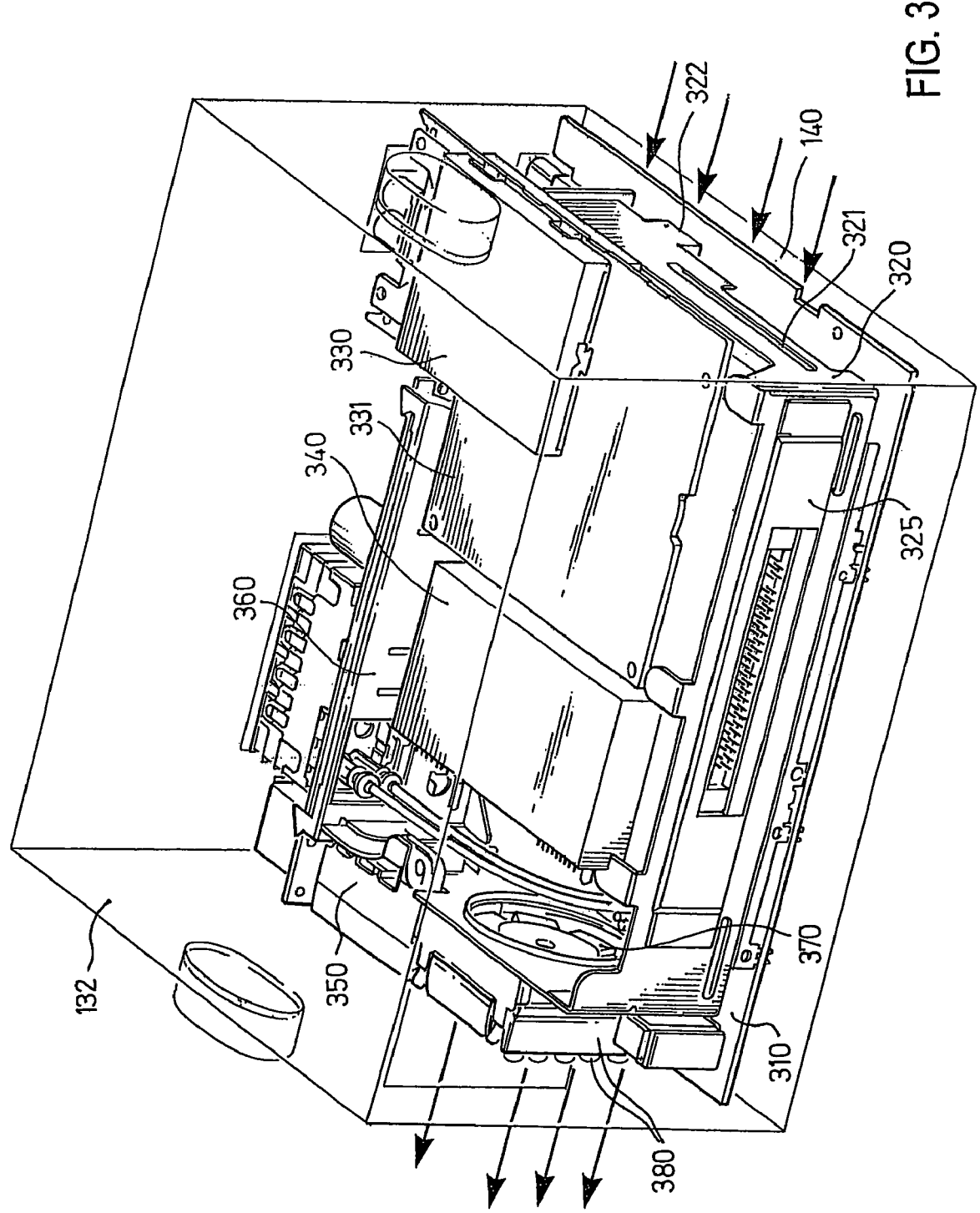
FIG. 3 is a front perspective view showing an example of the arrangement of different electronic components and the cooling system of the electronic system with the housing being shown in phantom view.

FIG. 3 is a front perspective view showing an example of the arrangement of different electronic components and the cooling system of the electronic system with the housing 100 being shown in phantom view. The housing 100 is shown in phantom lines and the front control panel 110 is omitted for the sake of clarity. At the bottom of the housing 100, a mother printed circuit board or main board 310 is provided. On the main board 310, a mounting structure or mounting unit 320 is placed, in which a hard disk 325 is installed. On the side surface of the mounting unit 320 a connecting segment 321 connects the front portion of the mounting unit 320 to the back portion where a mounting peg 322 for mounting the mounting unit 320 to the main board 310 is provided. The connecting segment 321 is smaller in width than the front and the rear part of the mounting unit 320. As described in further detail below, the connecting segment 321 advantageously allows the cooling air to pass above and below the mounting unit 320.

Figure 4:
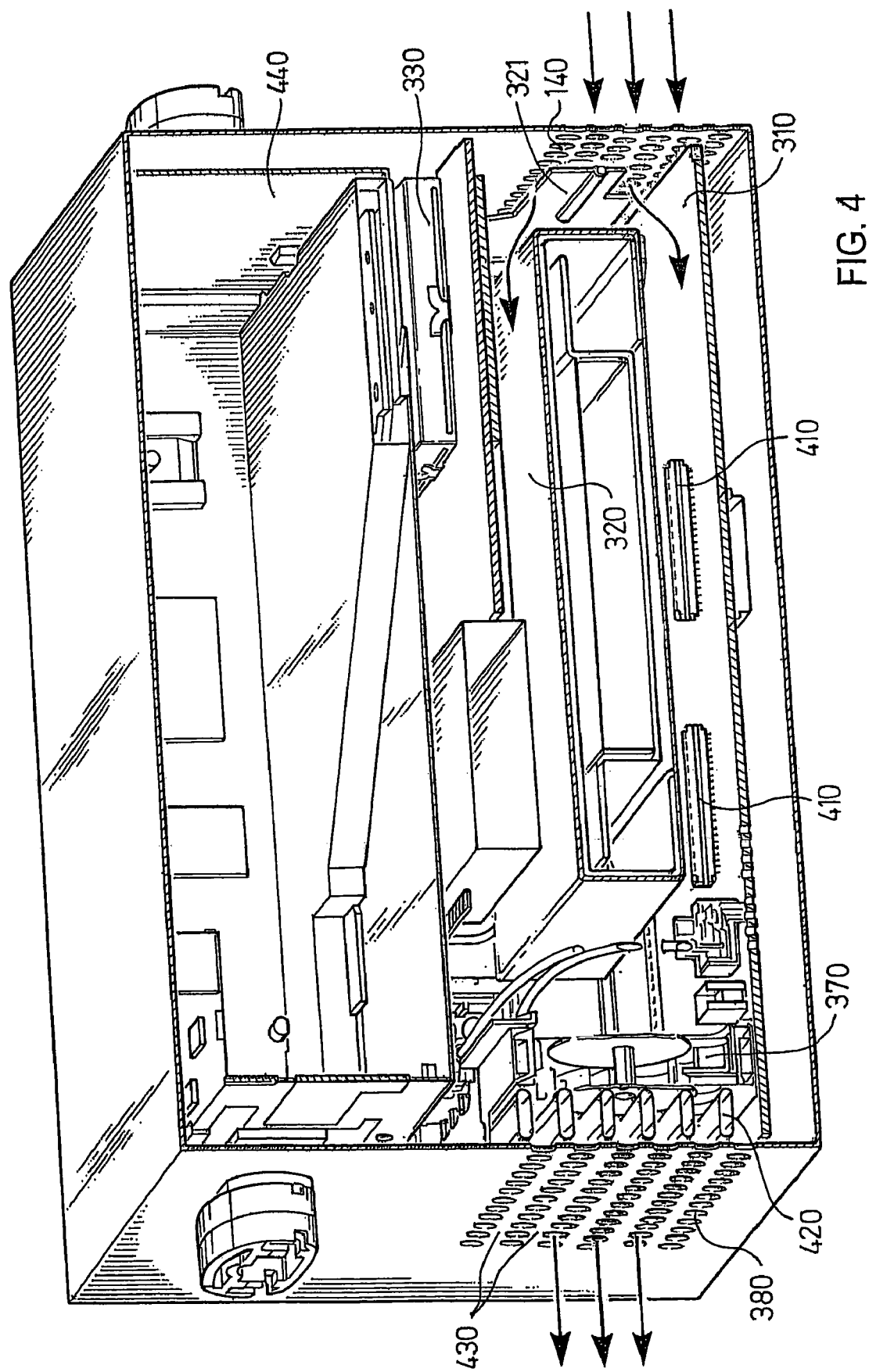
FIG. 4 is a sectional perspective view of the electronic system.

A tuner module 330 with a tuner board 331 is installed on top of the mounting unit 320 with the hard disk 325. Another extension module 340 having any other electronic module may be provided next to the tuner module 330. Next to the sidewall 132, the power amplifier 350 may be installed in the rear part of the housing 100. Additionally, a connector board 360 is provided to which the connectors shown in FIG. 2 are connected. Near the lower part of the side-wall 132 a ventilator 370 is provided. The ventilator 370 is configured in such a way that cooling air will flow off from the housing 100 through second openings 380 provided in the sidewall 132 opposite to the sidewall where the first openings 140 are provided. Also, as shown in FIG. 4, the ventilator 370 will move the air supplied from the first openings 140 through the lower part of the housing 100, the cooling air being removed through the second openings 380 provided in the opposite sidewall 132. All of the electronic components which generate heat and which, therefore, are to be cooled, are situated in the lower part of the housing 100. In this lower part of the housing 100, most of the cooling air is flowing from openings 140 to openings 380.

One advantage of the arrangement shown is that the intake air is coming from a space behind the support structure and not through openings in the front control panel 110. This reduces the dust or smoke or other small particles introduced into the housing 100 where they could deteriorate the functioning of the different electronic modules. Furthermore, the intake air is completely separated from the air outlet, so that the heated cooling air leaving the second openings 380 is not used as fresh air entering the housing 100 through the first openings 140.

FIG. 4 is a sectional perspective view of the electronic system. The cooling air supplied to the housing 100 enters through the openings 140. The housing 100 shown in FIG. 4 has the first and the second openings 140, 380 arranged at opposite sidewall 132 portions of the housing 100. The connecting segment 321 of the mounting unit 320 divides the airflow in an upper part and a lower part. The airflow in the upper part cools the upper surface of the mounting unit 320 and the hard disk installed on the mounting unit 320, together with the tuner board 330 and other possible electronic modules accommodated above the mounting unit 320 that are accommodated in the part of the housing 100 where the first and the second openings 140 and 380 are provided. Another part of the supplied air is deflected downwards to pass along the main board 310 cooling different electronic components 410 provided on the main board 310 before leaving the housing 100 through the second openings 380.

As can be seen in FIG. 4, cooling fins 420 are arranged between the sidewall 132 and the ventilator 370. The cooling fins 420 help to dissipate the heat generated by the power amplifier (not shown) which is installed in the rear part next to the left sidewall 132 as can be seen in FIG. 3. The power amplifier 350 is an electronic module that typically generates a large amount of the heat. The cooling fins 420 advantageously dissipate this heat. The cooling fins 420 are arranged in such a way that the openings 380 are arranged between pairs of cooling fins 420. As a consequence, the cooling air pushed through the second openings 380 by the ventilator 370 is guided along the cooling fins 420 and can easily exit through the second openings 380. The arrangement of the cooling fins 420, which are at the same height as a connecting portion 430 between the second openings 380 help to effectively remove the cooling air from the housing 100.

The optical read module for reading the data from the compact disk 113 shown in FIG. 1 is located in the upper part of the housing 100, which is part of the housing 100 where no openings are provided in the sidewalls 132. This reader of the storage medium can accommodate one storage medium or multiple storage mediums, such as a CD exchanger that holds up to six compact disks by way of example. As shown in FIG. 4, the optical read module is contained in a casing 440. From the arrangement of the first and the second openings 140, 380 and from the arrangement of the different electronic modules, it can be seen that the optical read module may not be significantly influenced by the cooling air flowing in the lower part of the housing 100. This helps to prevent particles in the cooling air from impeding the proper functioning of the reading module.

Figure 5:
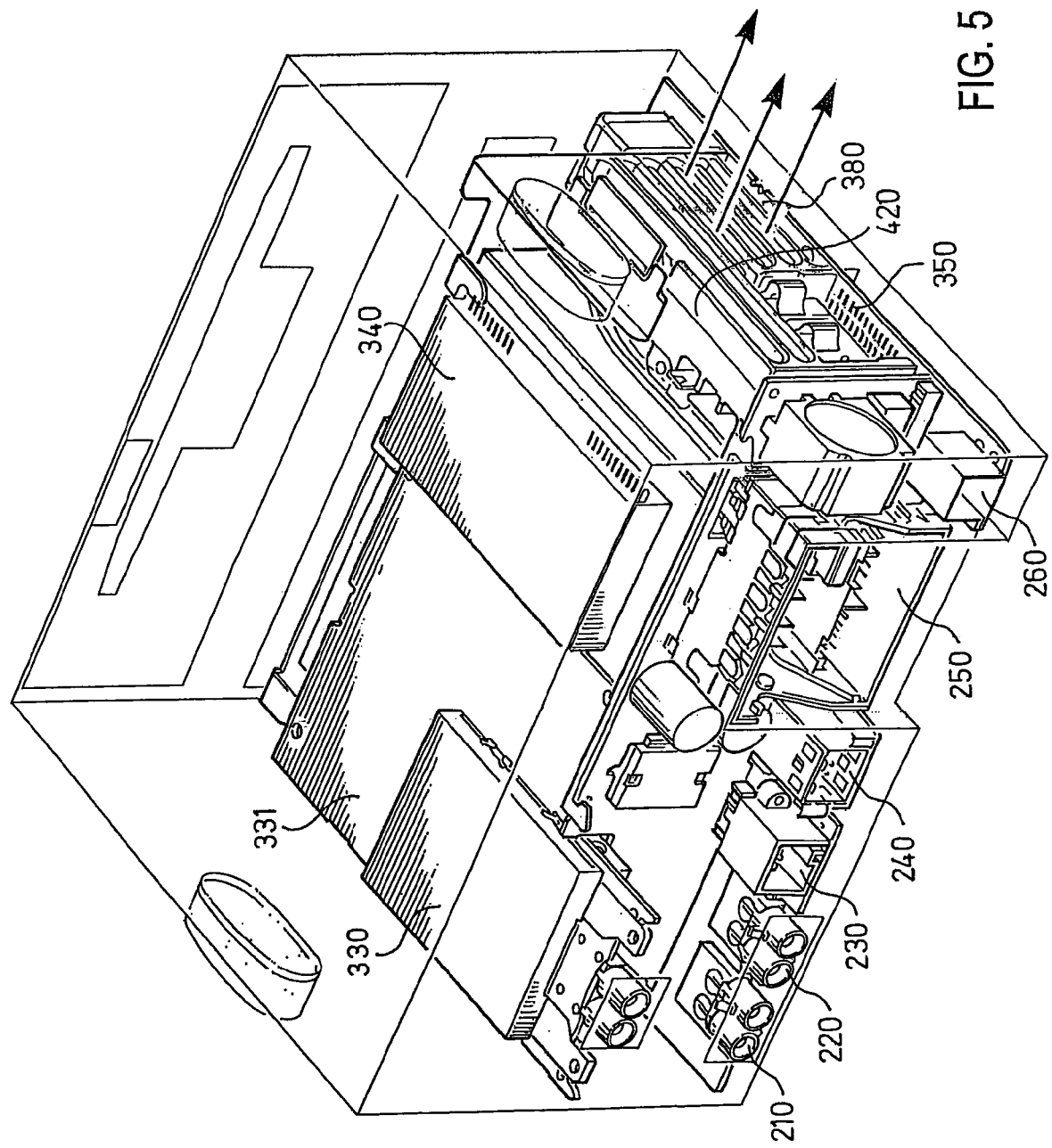
FIG. 5 is a rear elevation view showing an example of the arrangement of the electronic modules of the system.

FIG. 5 is a rear elevation view showing an example of the arrangement of the electronic modules of the system. The power amplifier 350 is arranged next to the sidewall 132 having the second openings 380 so that the heat generated by the power amplifier 350 can directly exit the housing through the second openings 380. A plurality of cooling fins 420 are provided on top of the amplifier 350 to dissipate the heat generated by the power amplifier 350. Furthermore, the different electronic modules 330, 340, and the connector board 360 with the different connectors are also shown in FIG. 5. Two electronic modules 330, 340 are shown. One of ordinary skill in the art will appreciate that the different electronic modules may include at least one of a radio module, an audio module, a navigation module, a telecommunication module or a storage medium reading module.

Figure 6:
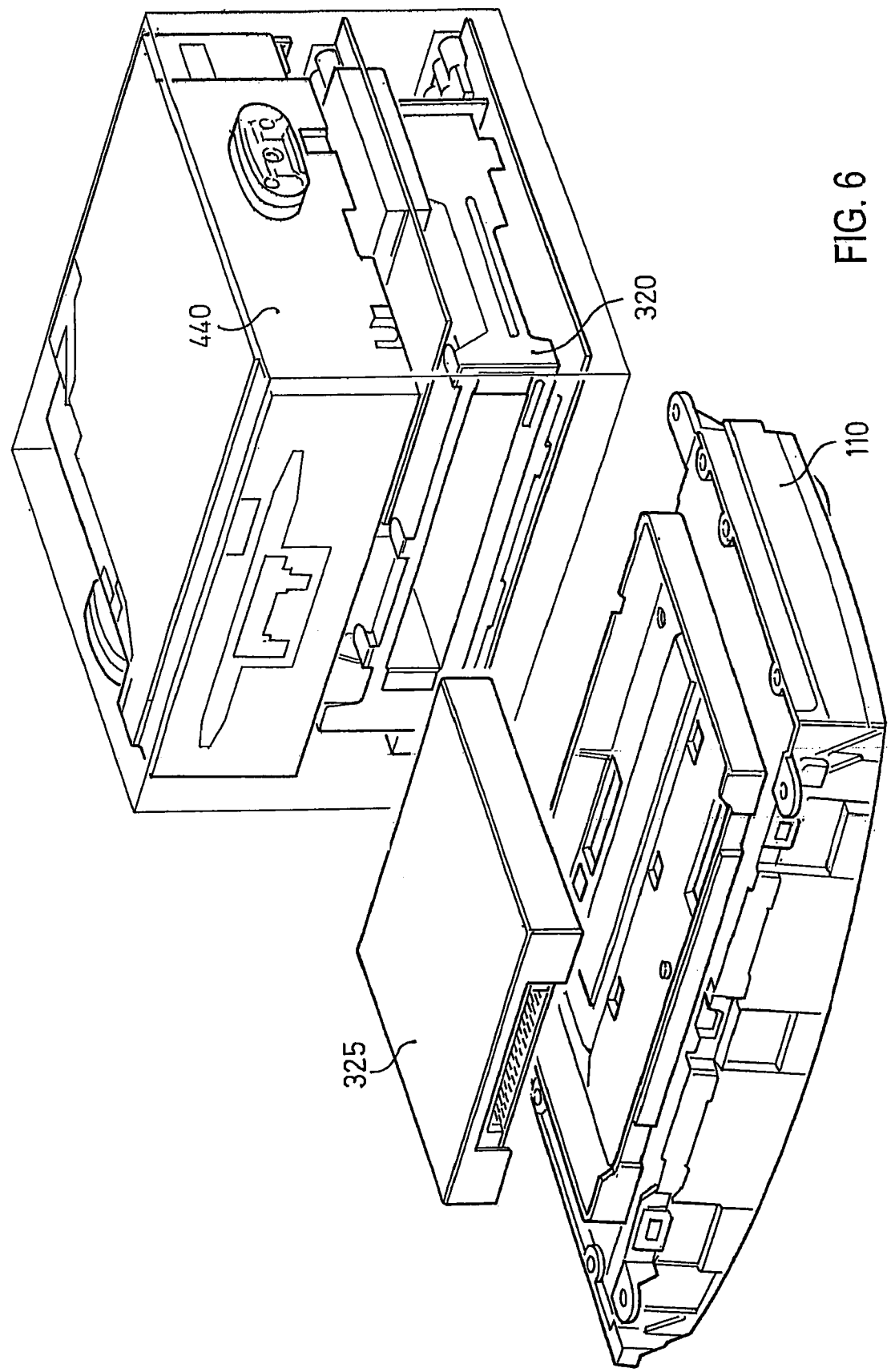
FIG. 6 is a perspective front view showing an example of the electronic system with a detached front control panel for introducing a hard disk.

FIG. 6 is a perspective front view showing an example of the electronic system with a detached front control panel 110 for introducing a hard disk 325. In the upper part of the housing 100, the casing 440 is shown for accommodating the optical read module for reading the storage medium inserted into the slot 112 (shown in FIG. 1) or through the slot 114 (shown in FIG. 1). The hard disk 325, which stores data such as map data for the navigation module, can be inserted into the mounting unit 320. The hard disk 325 does not need to be installed inside the system when the electronic built-in system is installed in a vehicle. It is possible to add the hard disk 325 at a later time. To this end, the front control panel 110 is detachably arranged on the housing 100, so that when the front panel is detached, the hard disk 325 can be inserted into the mounting unit 320. Preferably, it is not the end user who is able to change the configuration of the electronic system, but the car dealer.

The housings 100 shown in FIGS. 1-6 may not be hermetically sealed or airtight as there are openings or recesses provided in the housing 100 through which air can enter the housing 100. For example, the electronic built-in system may have slots, such as slots 112 and 114 (shown in FIG. 1), for introducing storage media, such as compact disks, in the front control panel 110. The supply of air through these slots cannot be completely prevented, but with the first openings 140 and the second openings 380 (shown in FIG. 4) for supplying and for removing the air, a large percentage of the cooling air which is guided through the housing 100 will enter the housing 100 through the first openings 140. The smallest resistance for the supplied air will be achieved when the supplying air enters the housing 100 through the first openings 140.

In addition, the first and the second openings 140, 380 shown in FIGS. 1 and 4 are arranged in such a way that the part of the housing 100 is ventilated where the heat generating modules are installed, whereas the other part of the housing 100 is ventilated by a much smaller amount, in this part the storage medium reading module being provided. This means that the first openings 140 and the second openings 380 may be both arranged on the lower part of the housing 100, and the heat generating modules such as the audio module, navigation module or telecommunication module are also arranged in the lower part of the housing 100, whereas the storage medium reading unit (e.g. the optical reading module discussed above with reference to FIG. 4) is provided in the upper part of the housing 100. One of ordinary skill in the art would appreciate that the reverse arrangement is also possible with the two openings 140 and 380 and the heat generating modules being located in the upper portion of the housing 100, and the storage medium reading module being provided in the lower part of the housing 100.

Summarizing, the electronic system of the invention provides an effective cooling of the different components included in the vehicle. The use of air coming from the passenger compartment can be avoided to a great extent, as the air inlet and the air outlet are situated in the space separated from the passenger compartment by the support structure carrying the electronic system. Additionally, the openings for supplying air and for removing the air are arranged in such a way, that the electronic components needing cooling air are accommodated in the airflow, whereas other electronic components, where cooling air is not needed, such as a CD reader, is accommodated in a portion of the housing which is not or much less vented by the cooling air.

It will be apparent to those of ordinary skill in the art that many more implementations are possible within the scope of this invention than those set forth above. The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. An electronic built-in system for installation in a support structure in a passenger compartment of a vehicle, the electronic built-in system comprising:
a housing configured for being mounted to the support structure, the housing including an outer wall, a first housing interior portion enclosed by the outer wall, a second housing interior portion enclosed by the outer wall and substantially fluidly isolated from the first housing interior portion, and a front control panel including operating elements for operating the system, the front control panel facing the passenger compartment when the electronic built-in system is installed in the support structure;
an electronic module disposed in the first housing interior portion;
a first opening formed through the outer wall at a first outer wall portion at which the first opening fluidly communicates with the first housing interior portion;
a second opening formed through the outer wall at a second outer wall portion at which the second opening fluidly communicates with the first housing interior portion; and
a cooling unit disposed in the first housing interior portion for guiding cooling air from the first opening, along the electronic module and to the second opening, where the cooling air carries heat dissipated by the electronic module away from the housing.

2. The electronic built-in system of claim 1, where the first outer wall portion and the second outer wall portion are respectively arranged at opposite sides of the housing, and the electronic module and the cooling unit are interposed between the first opening and the second opening.

3. The electronic built-in system of claim 1, where the first housing interior portion, the first openings and the second openings are arranged at a different height than the second housing interior portion.

4. The electronic built-in system of claim 3, where the first housing interior portion, the first openings and the second openings are arranged below the second housing interior portion.

5. The electronic built-in system of claim 3, where the first housing interior portion, the first openings and the second openings are arranged above the second housing interior portion.

6. The electronic built-in system of claim 3, further including a storage medium reading module disposed in the second housing interior portion.

7. The electronic built-in system of claim 6, where the second housing interior portion includes a casing and the storage medium reading module disposed in the casing, where the casing substantially fluidly isolates the storage medium reading module from the first housing interior portion.

8. The electronic built-in system of claim 1, where the electronic module is selected from the group consisting of a radio module, an audio module, a navigation module, a telecommunication module, a television tuner module, a memory module, and a mother printed circuit board.

9. The electronic built-in system of claim 8, further including a storage medium reading module for receiving a removable storage medium via an opening of the front control panel, the storage medium reading module disposed in the second housing interior portion.

10. The electronic built-in system of claim 1, further including a storage medium reading module for receiving a removable storage medium via an opening of the front control panel, the storage medium reading module disposed in the second housing interior portion.

11. The electronic built-in system of claim 1, where the cooling unit includes a ventilator situated next to the second opening for removing the cooling air from the housing.

12. The electronic built-in system of claim 1, where the cooling unit includes a plurality of cooling fins.

13. The electronic built-in system of claim 12, where the cooling unit further includes a ventilator situated next to the second opening for removing the cooling air from the housing, the plurality of cooling fins being interposed between the second opening and the ventilator.

14. The electronic built-in system of claim 12, further including a power amplifier disposed in the first housing interior portion adjacent to the plurality of cooling fins, where the cooling fins receive heat dissipated by the power amplifier.

15. The electronic built-in system of claim 12, where:
the second opening includes a plurality of rows of holes, each row disposed at a height different from the height of an adjacent row, each row separated from an adjacent row by a respective connecting portion of the second outer wall portion;
at least some of the cooling fins are disposed at the respective elevations of the connection portions; and
the cooling air is directed around the cooling fins and to the holes of the second opening.

16. The electronic built-in system of claim 1, further including a mounting unit disposed in the first housing interior portion, where the electronic module is disposed in the mounting unit.

17. The electronic built-in system of 1, further including a mounting unit disposed in the first housing interior portion, where the electronic module includes a first electronic module disposed in the mounting unit and a second electronic module disposed outside the mounting unit.

18. The electronic built-in system of 1, further including a mounting unit disposed in the first housing interior portion at substantially the same height as the first opening, where the cooling air guided from the first opening is generally split into an upper air flow passing above the mounting unit to the second opening and a lower air flow passing below the mounting unit to the second opening.

19. The electronic built-in system of claim 18, where the electronic module is mounted at the mounting unit, and the upper air flow and the lower air flow carry away heat dissipated by the electronic module.

20. The electronic built-in system of claim 18, where the electronic module includes a first electronic module mounted at the mounting unit and a second electronic module disposed above the mounting unit, the upper air flow and the lower air flow carry away heat dissipated by the first electronic module, and the upper air flow carries away heat dissipated by the second electronic module.

21. The electronic built-in system of claim 18, where the electronic module includes a first electronic module mounted at the mounting unit and a second electronic module disposed below the mounting unit, the upper air flow and the lower air flow carry away heat dissipated by the first electronic module, and the lower air flow carries away beat dissipated by the second electronic module.

22. The electronic built-in system of claim 18, where the electronic module includes a first electronic module mounted at the mounting unit, a second electronic module disposed above the mounting unit, and a third electronic module disposed below the mounting unit, and where the upper air flow and the lower air flow carry away heat dissipated by the first electronic module, the upper air flow carries away beat dissipated by the second electronic module, and the lower air flow carries away heat dissipated by the third electronic module.

23. The electronic built-in system of claim 1, where the outer wall is separated from the passenger compartment by the support structure when the electronic built-in system is installed in the support structure such that the cooling air does not originate from passenger compartment.

24. The electronic built-in system of claim 1, where the first housing interior portion is not accessible via the front control panel.

25. The electronic built-in system of claim 24, further including a storage medium reading module for receiving a removable storage medium via an opening of the front control panel, the storage medium reading module disposed in the second housing interior portion.

* * * * *